United States Patent
Zhu

(10) Patent No.: US 10,736,151 B2
(45) Date of Patent: Aug. 4, 2020

(54) RANDOM ACCESS FOR A WIRELESS DEVICE

(71) Applicant: Telefonaktiebolaget LM Ericsson (publ), Stockholm (SE)

(72) Inventor: Guowei Zhu, Soina (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/315,272

(22) PCT Filed: Jul. 6, 2016

(86) PCT No.: PCT/SE2016/050689
§ 371 (c)(1),
(2) Date: Jan. 4, 2019

(87) PCT Pub. No.: WO2018/009105
PCT Pub. Date: Jan. 11, 2018

(65) Prior Publication Data
US 2019/0246433 A1    Aug. 8, 2019

(51) Int. Cl.
*H04W 74/08* (2009.01)
*H04L 5/00* (2006.01)
*H04W 52/02* (2009.01)

(52) U.S. Cl.
CPC ....... *H04W 74/0833* (2013.01); *H04L 5/0037* (2013.01); *H04L 5/0053* (2013.01);
(Continued)

(58) Field of Classification Search
CPC .......... H04W 74/0833; H04W 52/0225; H04L 5/0053; H04L 5/0037; H04L 5/0073; H04L 5/0064
(Continued)

(56) References Cited

U.S. PATENT DOCUMENTS

| 2009/0201873 A1 | 8/2009 | Korhonen et al. |
| 2010/0135274 A1* | 6/2010 | Hong ............... H04B 7/2656 370/345 |

(Continued)

FOREIGN PATENT DOCUMENTS

| EP | 2 835 929 A1 | 2/2015 |
| WO | 2015 013073 A1 | 1/2015 |
| WO | 2015 116732 A1 | 8/2015 |

OTHER PUBLICATIONS

3GPP TS 36.212 v13.1.0; Technical Specification; 3rd Generation Partnership Project; Technical Specification Group Radio Access Network; Evolved Universal Terrestrial Radio Access (E-UTRA); Multiplexing and channel coding (Release 13)—Mar. 2016.

(Continued)

*Primary Examiner* — Rownak Islam
(74) *Attorney, Agent, or Firm* — Sage Patent Group

(57) ABSTRACT

There is provided mechanisms for random access. A method is performed by a wireless device. The method comprises transmitting a random access preamble to a network node. The method comprises determining a valid starting subframe of a random access response window for monitoring a common search space for a random access response from the network node. Starting time of the random access response window is adapted such that it starts with the valid subframe. The method comprises monitoring the common search space for the random access response only during the random access response window.

15 Claims, 7 Drawing Sheets

(52) U.S. Cl.
CPC .......... *H04L 5/0064* (2013.01); *H04L 5/0073* (2013.01); *H04W 52/0225* (2013.01)

(58) Field of Classification Search
USPC ........................................................ 370/329
See application file for complete search history.

(56) References Cited

U.S. PATENT DOCUMENTS

| | | | |
|---|---|---|---|
| 2018/0212736 A1* | 7/2018 | Chatterjee | H04L 5/0048 |
| 2018/0249508 A1* | 8/2018 | Gao | H04W 74/006 |
| 2019/0069277 A1* | 2/2019 | Awad | H04W 4/70 |
| 2019/0098667 A1* | 3/2019 | Lai | H04W 72/14 |

OTHER PUBLICATIONS

3GPP TS 36.321 v13.0.0; Technical Specification; 3rd Generation Partnership Project; Technical Specification Group Radio Access Network; Evolved Universal Terrestrial Radio Access (E-UTRA); Medium Access Control (MAC) protocol specification (Release 13)—Dec. 2015.

3GPP TS 36.331 v13.1.0; Technical Specification; 3rd Generation Partnership Project; Technical Specification Group Radio Access Network; Evolved Universal Terrestrial Radio Access (E-UTRA); Radio Resource Control (RRC); Protocol specification (Release 13)—Mar. 2016.

3GPP TS 36.211 v13.1.0; Technical Specification; 3rd Generation Partnership Project; Technical Specification Group Radio Access Network; Evolved Universal Terrestrial Radio Access (E-UTRA); Physical channels and modulation (Release 13)—Mar. 2016.

3GPP TS 36.213 v13.1.1; Technical Specification; 3rd Generation Partnership Project; Technical Specification Group Radio Access Network; Evolved Universal Terrestrial Radio Access (E-UTRA); Physical layer procedures (Release 13)—Mar. 2016.

PCT Notification of Transmittal of the International Search Report and the Written Opinion of the International Searching Authority, or the Declaration for International application No. PCT/SE2016/050689—dated Mar. 23, 2017.

3GPP TSG RAN WG1 Meeting #83; Anaheim, US; Source: ZTE; Title: Remaining issues on M-PDCCH for MTC enhancement (R1-156664)—Nov. 15-22, 2015.

3GPP TSG RAN WG1 Meeting #83; Anaheim, USA; Source: LG Electronics; Title: Details on RACH procedure for MTC UE (R1-156847)—Nov. 15-22, 2015.

* cited by examiner

RANDOM ACCESS FOR A WIRELESS DEVICE

PRIORITY

This nonprovisional application is a U.S. National Stage Filing under 35 U.S.C. § 371 of International Patent Application Serial No. PCT/SE2016/050689 filed Jul. 6, 2016 which is hereby incorporated by reference in its entirety.

TECHNICAL FIELD

Embodiments presented herein relate a wireless device, a computer program, and a computer program product for random access.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to provide efficient network access for wireless devices served by the communications network.

In general terms, in order for a wireless device to establish network access it, according to the Long Term Evolution (LTE) family of telecommunications standards, initiates a random access procedure. In a first step the wireless device transmits a random access preamble to the network node in the communications network. The network node responds with a random access response. This is followed by a scheduled transmission from the wireless device and a contention resolution by the network node. Properties in relation to the random access response in LTE will be disclosed next.

Once the random access preamble is transmitted and regardless of the possible occurrence of a measurement gap or sidelink discovery gap for reception, the wireless device monitors a Physical Downlink Control Channel (PDCCH), such as the MPDCCH, where the M stand form machine type communications, for random access response(s) identified by the random access Radio Network Temporary Identifier (RA-RNTI) in the random access response window which starts at the subframe that contains the end of the preamble transmission plus three subframes and has a length in terms of subframes defined by a parameter denoted ra-ResponseWindowSize-r3.

Once a radio resource control (RRC) connection request message (also sometimes known as Message 3, or MSG3 for short), is transmitted from the wireless device, the medium access control (MAC) entity in the wireless device starts a timer denoted mac-ContentionResolutionTimer-r13 and restarts the mac-ContentionResolutionTimer-r13 at each hybrid automatic repeat request (HARQ) retransmission.

According to the document 3GPP TS 36.213 version V13.1.1, for the protocol layer 1 (L1) random access procedure the uplink transmission of a Bandwidth reduced Low complexity (BL) device or a Coverage Enhancement (CE) device after a random access preamble transmission is as follows.

If a PDCCH with associated RA-RNTI is detected and the corresponding Downlink Shared Channel (DL-SCH) transport block reception ending in subframe n contains a response to the transmitted preamble sequence, the wireless device, according to the information in the response, transmits an UL-SCH transport block in the first subframe $n+k_1$, where $k_1 \geq 6$, if the uplink delay field in subclause 6.2 of 3GPP TS 36.213 version V13.1.1 is set to zero where the subframe $n+k_1$ is the first available uplink subframe for Physical Uplink Shared Channel (PUSCH) transmission, where for time division duplex (TDD) serving cell, the first uplink subframe for PUSCH transmission is determined based on the uplink/downlink configuration (i.e., as given by a parameter denoted subframeAssignment) indicated by higher protocol layers. The subframe $n+k_1$ is the first available uplink subframe for PUSCH transmission determined based on a parameter denoted fdd-UplinkSubframeBitmapLC for frequency division duplex (FDD) and parameters denoted fdd-DownlinkOrTddSubframeBitmapLC and subframeAssignment for TDD. The wireless device postpones the PUSCH transmission to the next available UL subframe after $n+k_1+\Delta$, if the field is set to 1. The value of $\Delta$ is the number of RRC connection request message PUSCH repetitions as indicated in the random access response.

If a random access response is received and its reception ends in subframe n, and the corresponding DL-SCH transport block does not contain a response to the transmitted preamble sequence, the wireless device will, if requested by higher layers, be ready to transmit a new preamble sequence no later than in subframe n+5.

If no random access response is received in subframe n, where subframe n is the last subframe of the random access response window, the wireless device will, if requested by higher layers, be ready to transmit a new preamble sequence no later than in subframe n+4.

For Type2-MPDCCH common search space, the number of physical resource block (PRB)-pairs in MPDCCH-PRB-set P is 2+4 PRB-pairs.

If the most recent coverage enhancement level used for PRACH (Physical Random Access Channel) is coverage enhancement level 0 and 1, the aggregation and repetition levels defining the search spaces and the number of monitored MPDCCH candidates are determined from Table 9.1.5-1b in 3GPP TS 36.213 version V13.1.1, by assuming that the number of candidates for L'<8 as zero.

If the most recent coverage enhancement level used for PRACH is coverage enhancement level 2 and 3, the aggregation and repetition levels defining the search spaces and the number of monitored MPDCCH candidates are determined from Table 9.1.5-2b in 3GPP TS 36.213 version V13.1.1, where r1, r2, r3, r4 are determined from Table 9.1.5-3 in 3GPP TS 36.213 version V13.1.1 by substituting the value of $r_{max}$ with the value of higher layer parameter mPDCCH-NumRepetition-RA.

However, there is still a need for an improved random access procedure for the wireless device.

SUMMARY

An object of embodiments herein is to provide an efficient random access procedure for the wireless device.

According to a first aspect there is presented a method for random access. The method is performed by a wireless device. The method comprises transmitting a random access preamble to a network node. The method comprises determining a valid starting subframe of a random access response window for monitoring a common search space for a random access response from the network node. Starting time of the random access response window is adapted such that it starts with the valid subframe. The method comprises monitoring the common search space for the random access response only during the random access response window.

Advantageously this provides efficient random access response monitoring of the wireless device.

Advantageously this enables a high efficient usage of the time and frequency resources within the common search space for the wireless device.

Advantageously this gives a high random access success rate by having more common search space resources within the random access response window.

Advantageously this enables the wireless device to save power by avoiding useless monitoring.

Advantageously this improves key performance indicators in the communications network served by the network node.

According to a second aspect there is presented a wireless device for random access. The wireless device comprises processing circuitry. The processing circuitry is configured to cause the wireless device to transmit a random access preamble to a network node. The processing circuitry is configured to cause the wireless device to determine a valid starting subframe of a random access response window for monitoring a common search space for a random access response from the network node. Starting time of the random access response window is adapted such that it starts with the valid subframe. The processing circuitry is configured to cause the wireless device to monitor the common search space for the random access response only during the random access response window.

According to a third aspect there is presented a wireless device for random access. The wireless device comprises processing circuitry and computer program product. The computer program product stores instructions that, when executed by the processing circuitry, causes the wireless device to perform operations, or steps. The operations, or steps, cause the wireless device to transmit a random access preamble to a network node. The operations, or steps, cause the wireless device to determine a valid starting subframe of a random access response window for monitoring a common search space for a random access response from the network node. Starting time of the random access response window is adapted such that it starts with the valid subframe. The operations, or steps, cause the wireless device to monitor the common search space for the random access response only during the random access response window.

According to a fourth aspect there is presented wireless device for random access. The wireless device comprises a transmit module configured to transmit a random access preamble to a network node. The wireless device comprises a determine module configured to determine a valid starting subframe of a random access response window for monitoring a common search space for a random access response from the network node. Starting time of the random access response window is adapted such that it starts with the valid subframe. The wireless device comprises a monitor module configured to monitor the common search space for the random access response only during the random access response window.

According to a fifth aspect there is presented a computer program for random access, the computer program comprising computer program code which, when run on a wireless device, causes the wireless device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
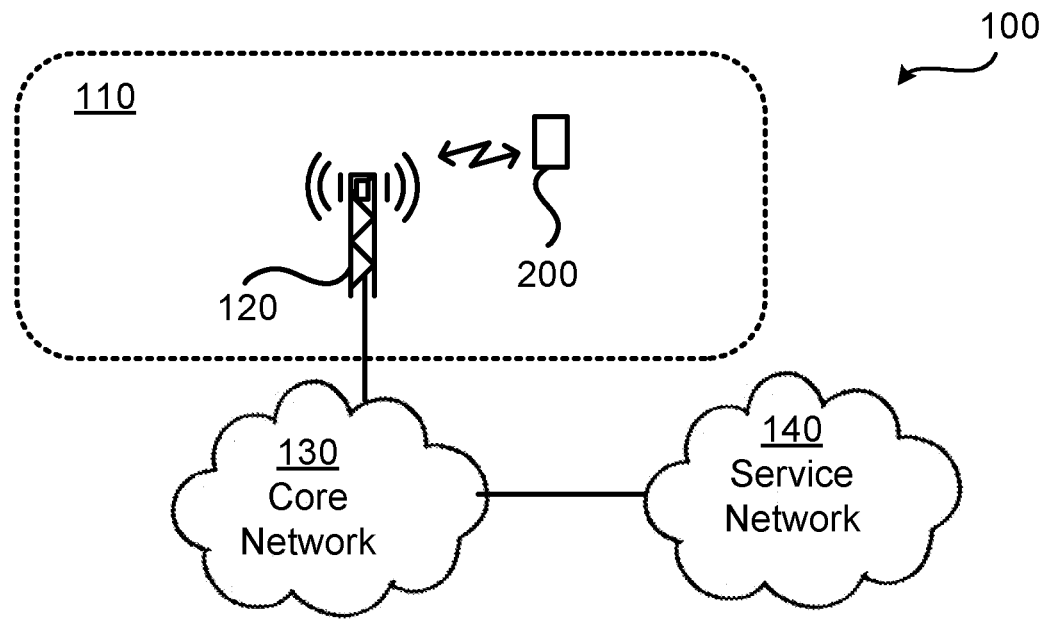
FIG. 1 is a schematic diagram illustrating a communication network according to embodiments.

FIG. 1 is a schematic diagram illustrating a communications network 100 where embodiments presented herein can be applied. The communications network 100 comprises a radio access network 110 comprising at least one network node 120, a core network 130, and a service network 140. Each of network nodes 120 could be provided as a radio access network node, radio base station, base transceiver station, node B, evolved node B, access node, or access point.

The network node 120 provides network access to the communications network 100 for at least one wireless device. The wireless device 200 could be provided as a portable wireless device, mobile station, mobile phone, handset, wireless local loop phone, user equipment (UE), smartphone, laptop computer, tablet computer, wireless mode, sensor, machine type communications (MTC) device, a Bandwidth reduced Low complexity (BL) device, a Coverage Enhancement (CE) device, or any combination thereof.

By being operatively connected to the radio access network 110 via the network node 120 the wireless device 200 has network access and is thereby enabled to access services and exchange data with the service network 140.

As disclosed above, in order for the wireless device 200 to establish network access to the communications network 100 the wireless device 200 initiates a random access procedure. Once the random access preamble is transmitted and regardless of the possible occurrence of a measurement gap or sidelink discovery gap for reception, the wireless device 200 monitors a PDCCH, such as the MPDCCH.

For random access MPDCCH, a starting subframe for a search space in which a response to a random access response may be transmitted to the wireless device 200 from the network node 120 can be configured over RRC. The starting subframes of the search space are given by $(10n_f + \lfloor n_s/2 \rfloor) \bmod T_{MPDCCH} = 0$, where $n_f$ denotes system frame number (SFN), where $n_s$ denotes slot number within a radio frame, where $T_{MPDCCH} = R_{max} \cdot G$, where $R_{max}$ is a maximum repetition level, and where G is an integer.

G takes one of the values in the set $\{1, 1.5, 2, 2.5, 4, 5, 8, 10\}$ or in the set or one value in the set $\{1, 2, 4, 5, 8, 10, 20, \text{spare1}\}$ with the index given by a parameter denoted mpdcch-startSF-CSS-RA-r3.

$R_{max}$ is the maximum repetition level of an MPDCCH and is configured over RRC by a parameter denoted mpdcch-NumRepetition-RA-r13. $R_{max}$ takes one value in the set $\{1, 2, 4, 8, 16, 32, 64, 128, 256\}$ with index given by the parameter mpdcch-NumRepetition-RA-r13.

A search space with repetitions that crosses over system frame number with value 0, i.e., SFN=0, is not monitored by the wireless device.

Note that the value of $(10n_f + \lfloor n_s/2 \rfloor)$ is the absolute subframe number $n_{sf}^{abs}$ within a SFN wrap-around period (such as 10240 subframes).

Figure 2:
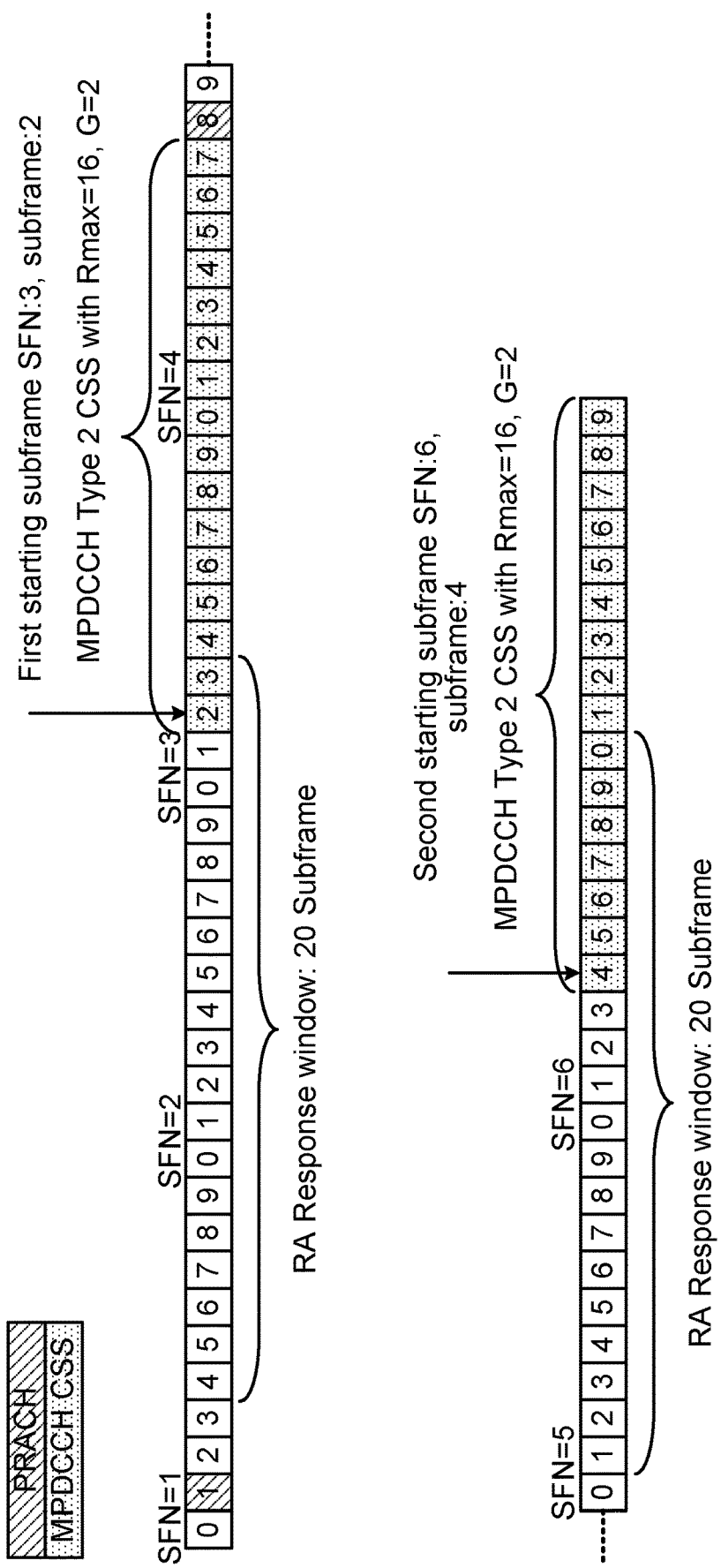
FIG. 2 schematically illustrates placement in time of random access response window according to state of the art.

Reference is now made to FIG. 2 illustrating placement in time of the random access response window(s) using the above disclosed procedure. According to this illustrative example, and using definition of parameters as given in 3GPP TS 36.331 V 13.1.0, it is assumed that the parameter mpdcch-NumRepetition-RA-r13 is configured with r16 (i.e., $R_{max}=16$), that parameter mpdcch-startSF-CSS-RA-r13 is configured with v2 (i.e., that G=2), that the parameter ra-ResponseWindowSize-r13 is configured with sf20 (i.e., that the duration of the RA response window is 20 subframes), that BI field value is 6, that Backoff Parameter value is 80 ms and that the PRACH is transmitted in SFN 1, subframe 1. Then: $T_{MPDCCH} = R_{max} \cdot G = 16 \cdot 2 = 32$, which yields $(10n_f + \lfloor n_s/2 \rfloor) \bmod T_{MPDCCH} = 0$, and the first MPDCCH starting subframe is SFN=3 and subframe 2, the second MPDCCH starting subframe is SFN=6 and subframe 4, and the third MPDCCH starting subframe is SFN=9 and subframe 6. Hence, from FIG. 2 follows that the random access response window as applied by the wireless device 200 is misaligned with the MPDCCH type2 CSS (i.e., a common search space of type2 frame structure for the MPDCCH); the overlap is just two subframes for the first starting subframe (SFN: 3, subframe: 2) and seven subframes for the second starting subframe (SFN: 6, subframe: 4).

Some issues with the above disclosed for random access will now be summarized. Firstly, the random access response window does not align with the starting subframe of MPDCCH Type2 common search space (CSS); the random access response window as applied by the wireless device 200 does thus no align with the period when the response may be carried by the MPDCCH Type2 CSS. Because of the non-alignment this results in a waste of time and frequency resources of the MPDCCH Type2 CSS. Further, if the starting subframe of the MPDCCH Type2 CSS is not larger than 2 subframes from the time point the random access preamble is transmitted, even though some parts of the MPDCCH Type2 CSS are within the random access response window, these parts are not related to the preamble just sent. The wireless device 200 will still monitor and try to decode these CSS, resulting in power being wasted at the wireless device 200. Further, wireless devices 200 of the type BL or CE will perform more attempts for succeeding with the random access, which causes low efficiency of time and resources resource within the MPDCCH Type2 CSS. Wireless devices 200 of the type BL or CE 100 could waste power by monitoring all the subframes in the random access response window, since sometimes there is not any subframes carrying MPDCCH Type2 CSS at all in the random access response window. The above issues could lead to random access failure and low random access rate for the wireless device 200, in turn degrading the network performance in terms of cell throughput, average access time, maximum access users, or other key performance indicators (KPIs).

Further, once the RRC connection request message is transmitted the wireless device 200 will immediately start a timer denoted MAC-ContentionResolutionTimer-r13 (and restart this timer at each HARQ retransmission) if the starting MAC-ContentionResolutionTimer-r13 does not align with the starting subframe of MPDCCH Type2 CSS or the starting subframe of MPDCCH Type2 CSS is smaller than the time point when the RRC connection request message is transmitted. Some issues with this handling of the timer will be summarized next. First, the MAC-ContentionResolutionTimer-r13 does not align with the valid starting subframe of the MPDCCH Type2 CSS for the wireless device 200. Because of the non-alignment this results in a waste of time and frequency resources of the MPDCCH Type2 CSS. Further, if the starting subframe of the MPDCCH Type2 CSS is smaller than the subframe from the time the RRC connection request message is transmitted (i.e., when the starting subframe of the MPDCCH Type2 CSS occurs prior to the transmission of the RRC connection request message), even though some parts of the MPDCCH Type2 CSS exist before MAC-ContentionResolutionTimer-r13 expires, these parts are not related to the RRC connection request message of the wireless device 200.

But the wireless device 200 will still monitor and try to decode these parts, resulting in power being wasted at the wireless device 200. Further, BL or CE type wireless devices 200 will perform more attempts for succeeding with the random access, which causes low efficiency of time and resources resource within the MPDCCH Type2 CSS. Wireless devices 200 of the type BL or CE could waste power by monitoring all the subframes before the MAC-Contention- ResolutionTimer-r13 expires, since sometimes there is not any MPDCCH Type2 CSS during this monitoring period. The above issues could lead to random access failure and low random access rate for the wireless device 200, in turn degrading the network performance in terms of cell throughput, average access time, maximum access users, or other KPIs.

The embodiments disclosed herein relate to a more efficient random access procedure for the wireless device 200 than the random access procedure disclosed above. In order to obtain such an efficient random access procedure there is provided a wireless device 200, a method performed by the wireless device 200, a computer program product comprising code, for example in the form of a computer program, that when run on a wireless device 200, causes the wireless device 200 to perform the method.

Figure 3:
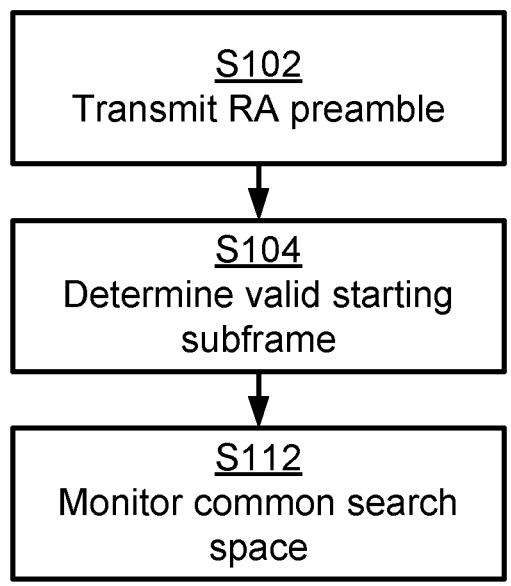
FIGS. 3, 4, 6 and 7 are flowcharts of methods according to embodiments.
Figure 4:
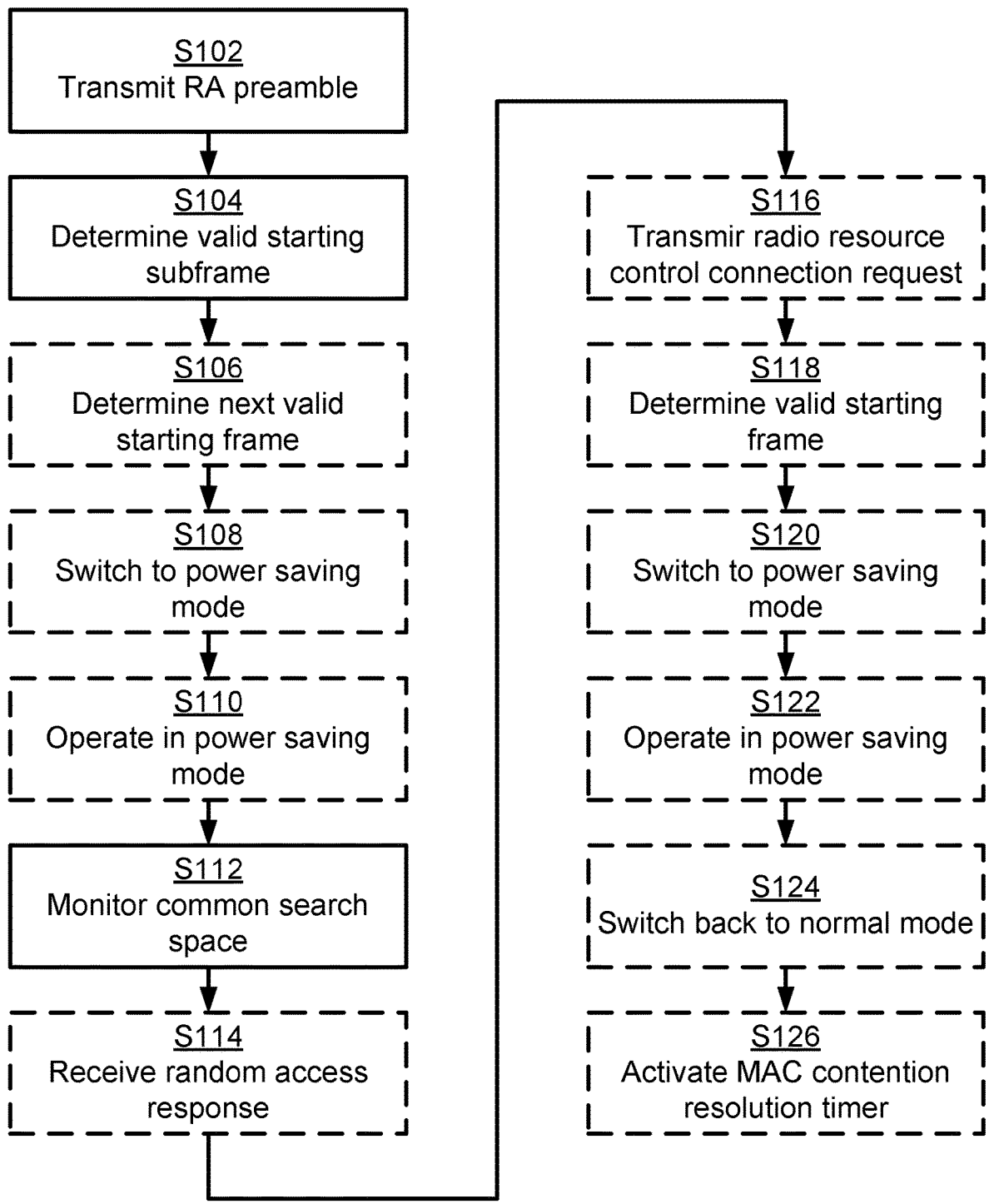

FIGS. 3 and 4 are flow charts illustrating embodiments of methods for random access. The methods are performed by the wireless device 200. The methods are advantageously provided as computer programs 1020.

Reference is now made to FIG. 3 illustrating a method for random access as performed by the wireless device 200 according to an embodiment.

S102: The wireless device 200 transmits a random access preamble to the network node 120.

The wireless device 200 then monitors the random access response from the network node 120 in a random access response window starting with the valid starting subframe. Hence the wireless device 200 is configured to perform step S104:

S104: The wireless device 200 determines a valid starting subframe of a random access response window for monitoring a common search space for a random access response from the network node 120. Starting time of the random access response window is adapted such that it starts with the valid subframe.

S112: The wireless device 200 monitors the common search space for the random access response only during the random access response window.

The wireless device 200 knows the valid starting subframe of the MPDCCH Type2 CSS. After the wireless device 200 has sent the random access preamble to the network node 12, three subframes later the wireless device 200 does not monitor the random access response until a valid starting subframe of the MPDCCH Type2 CSS, which means that the random access response window starts with the valid starting subframe of the MPDCCH Type2 CSS. Sometimes the wireless device 200 needs to wait many subframes to meet the valid starting subframe of the MPDCCH Type2 CSS and during these periods the wireless device 200 can switch to a power saving mode, and change back to a normal mode (i.e., a non-power saving mode) when beginning to monitor the random access response i.e., when the starting subframe of MPDCCH Type2 CSS occurs. In this respect, the power saving mode means that the wireless device 200 does not monitor the common search space until the valid starting point for the random access response window.

Figure 5:
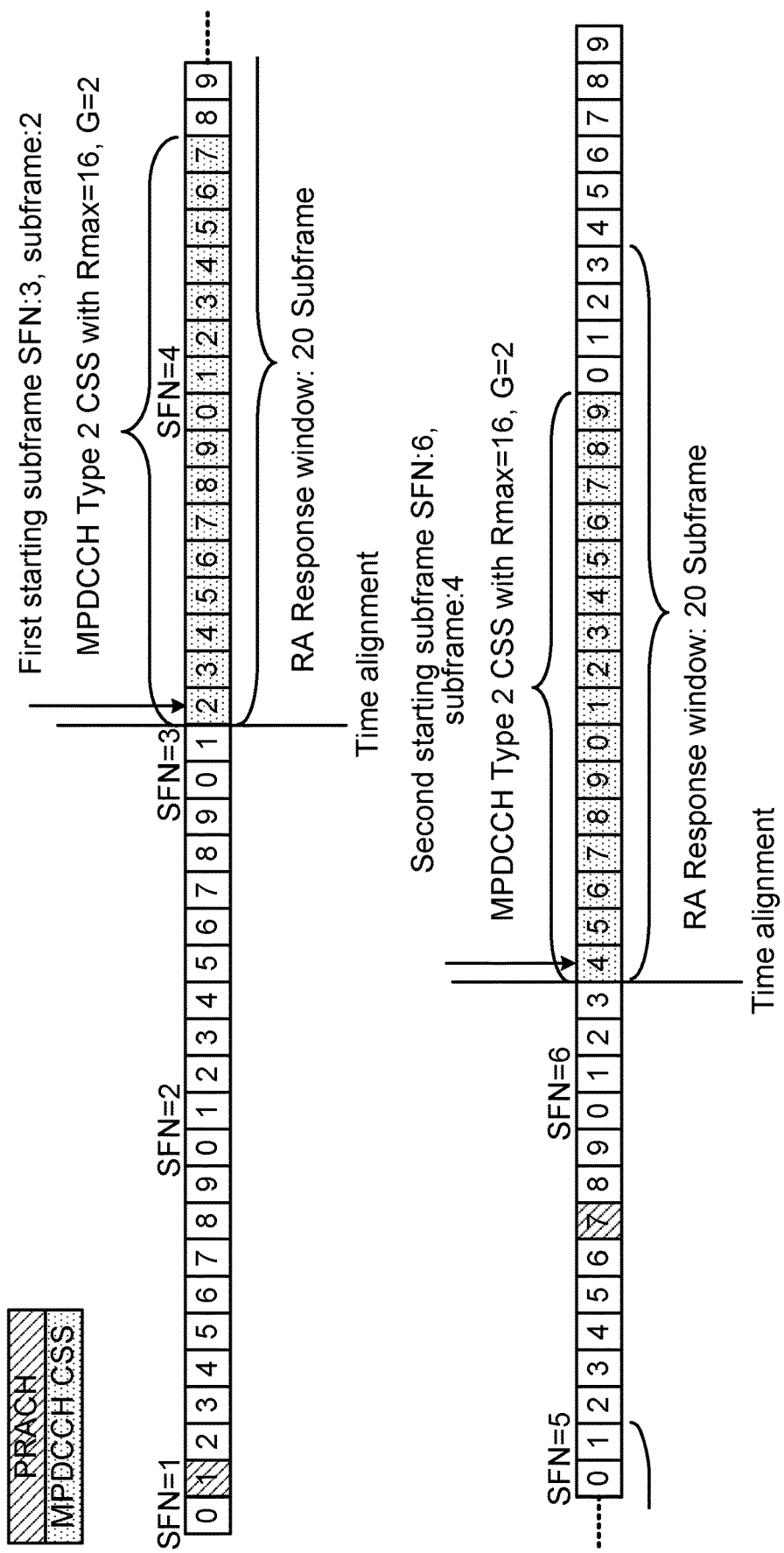
FIG. 5 schematically illustrates placement in time of random access response window according to an embodiment.

Reference is now made to FIG. 5 illustrating placement in time of the random access response window(s) using a procedure according to the herein disclosed embodiments. The wireless device 200 is assumed to transmit a random access preamble at SFN 1, subframe 1 and knows that the latest valid starting subframe of MPDCCH Type2 CSS is at SFN 3, subframe 2. From FIG. 5 follows that the random access response window perfectly aligns with the MPDCCH type2 CSS for the first starting subframe (SFN: 3, subframe: 2) and for the second starting subframe (SFN: 6, subframe: 4). As will be further disclosed below, the wireless device 200 may switch to a power saving mode when not monitoring the random access response window and switch back to normal mode when starting to monitor the random access response window from the valid starting subframe of the MPDCCH Type2 CSS at SFN 3, subframe 2.

Embodiments relating to further details of random access as performed by the wireless device 200 will now be disclosed.

There can be different examples of common search spaces. For example, according to an embodiment the common search space is a Machine-Type Communications Physical Downlink Control Channel MPDCCH. Further, according to an embodiment the common search space is a MPDCCH Type2 common search space.

There are different ways to determine the valid starting subframe. According to an embodiment the valid starting subframe is determined based on an absolute subframe number, $n_{sf}^{abs}$, within a system frame number wrap-around period. As disclosed above, the valid starting subframe could be determined according to Eq. 1:

$$(10n_f + \lfloor n_s/2 \rfloor) \bmod T_{MPDCCH} = 0. \quad \text{(Eq. 1)}$$

Hence, in some aspects, the valid starting subframe is the first subframe in which a RA response may first be sent to the wireless device 200 and this first subframe is determined as the first occasion of $(10n_f + \lfloor n_s/2 \rfloor) \bmod T_{MPDCCH} = 0$ unless this results in a slot number $n_s \leq t_1 + 2$; then the valid subframe is the next occasion according to Eq. 1.

Reference is now made to FIG. 4 illustrating methods for random access as performed by the wireless device 200 according to further embodiments. It is assumed that steps S102, S104, S112 are performed as described above with reference to FIG. 3 and a thus repeated description thereof is therefore omitted.

As mentioned above, when the starting subframe is not larger than 2 subframes from time $t_1$ as defined by the random access preamble being transmitted, the wireless device 200 continues to calculate a next starting subframe to define the valid starting subframe (i.e., the subframe when the response to the random access response may first be received. Hence, according to an embodiment the valid starting subframe is denoted a candidate starting subframe, and where the random access preamble is to transmitted at time $t_1$, the wireless device 200 is configured to perform step S106:

S106: The wireless device 200 determines, when the candidate starting subframe is distanced at most two subframes from the time $t_1$, a next valid starting subframe of the random access response window.

The wireless device 200 could be in a power saving mode when not monitoring the common search space for the random access response. Hence, according to an embodiment the wireless device 200 is configured to perform step S110:

S110: The wireless device 200 operates in a power saving mode between transmitting the random access preamble and monitoring the common search space.

In some aspects the wireless device 200 operates in the power saving mode only when the valid starting subframe is larger than 2 subframes from time $t_1$. However, in other aspects the wireless device 200 switches to the power saving mode also when the valid starting subframe is distanced less than at least two subframes from the time $t_1$. Hence, according to an embodiment the wireless device 200 is configured to perform step S108:

S108: The wireless device 200 switches to the power saving mode. Hence, the wireless device 200 could switch to the power saving mode when the valid starting subframe is larger than 2 subframes from time $t_1$ and/or when the valid starting subframe is not larger than 2 subframes from time $t_1$.

In some aspects it is assumed that the wireless device 200 receives a random access response in the random access response window. Hence, according to an embodiment the wireless device 200 is configured to perform step S114:

S114: The wireless device 200 receives a random access response from the network node 120 in the random access response window.

Once having received the random access response the wireless device 200 transmits a radio resource control connection request message (as above, sometimes also denoted MSG3). Hence, according to an embodiment the wireless device 200 is configured to perform step S116:

S116: The wireless device 200 transmits a radio resource control connection request message to the network node 120 in response to having received the random access response.

Once having transmitted the radio resource control connection request message the wireless device 200 could activate a timer. Hence, according to an embodiment the wireless device 200 is configured to perform step S126:

S126: The wireless device 200 activates a MAC contention resolution timer when having transmitted the radio resource control connection request message. The MAC contention resolution timer starts at a valid starting subframe of a common search space for a response from the network node 200 to the radio resource control connection request message.

In this respect, the power saving mode further means that the wireless device 200 does not monitor the common search space until the valid starting point for the timer.

There are different types of MAC contention resolution timers. According to an embodiment the MAC contention resolution timer is a MAC-ContentionResolutionTimer-r13.

Assume that the radio resource control connection request message is transmitted at time $t_2$. Then if the valid starting subframe is smaller than time $t_2$, the wireless device 200 could continue to calculate a next valid starting subframe. Hence, according to an embodiment the wireless device 200 is configured to perform step S118:

S126: The wireless device 200 determines, when the valid starting subframe for the response from the network node 200 to the radio resource control connection request message occurs earlier than the time $t_2$, a next valid starting subframe of the random access response window for the response from the network node 200 to the radio resource control connection request message.

The wireless device 200 could be in a power saving mode after having transmitted the radio resource control connection request message. Hence, according to an embodiment the wireless device 200 is configured to perform step S122:

S122: The wireless device 200 operates in a power saving mode between transmitting the radio resource control connection request message and activating the MAC contention resolution timer.

In some aspects the wireless device 200 operates in the power saving mode only when the valid starting subframe is not smaller than the time $t_2$. In some aspects the wireless device 200 operates in the power saving mode also when the valid starting subframe is smaller than the time $t_2$. Hence, according to an embodiment the wireless device 200 is configured to perform step S120:

S120: The wireless device 200 switches to the power saving mode. Hence, the wireless device 200 could switch to the power saving mode when a valid starting subframe for monitoring the common search space in the further random access response window is smaller than time $t_2$ and/or when a valid starting subframe for monitoring the common search space in the further random access response window is not smaller than time $t_2$.

The wireless device 200 could then start the timer when a valid starting subframe for the response from the network node occurs. Hence, according to an embodiment the wireless device 200 is configured to perform step S124

S124: The wireless device 200 switches back to normal mode from the power saving mode at the valid starting subframe for the response from the network node 120 to the radio resource control connection request message. The MAC contention resolution timer is then activated in response thereto (i.e., step S126 is performed in response to step S124 having been performed).

Hence, according to an embodiment, once the radio resource control connection request message (MSG3) is transmitted from the wireless device 200, the wireless device 200 does not start its MAC-ContentionResolutionTimer-r13 until a valid starting subframe of MPDCCH Type2 CSS. Sometimes the wireless device 200 needs to wait many subframes to meet the valid starting subframe of the MPDCCH Type2 CSS and during these period the wireless device 200 can switch to the power saving mode, then change back to normal mode when the starting subframe of the MPDCCH Type2 CSS is met and start the timer MAC-ContentionResolutionTimer-r13.

Figure 6:
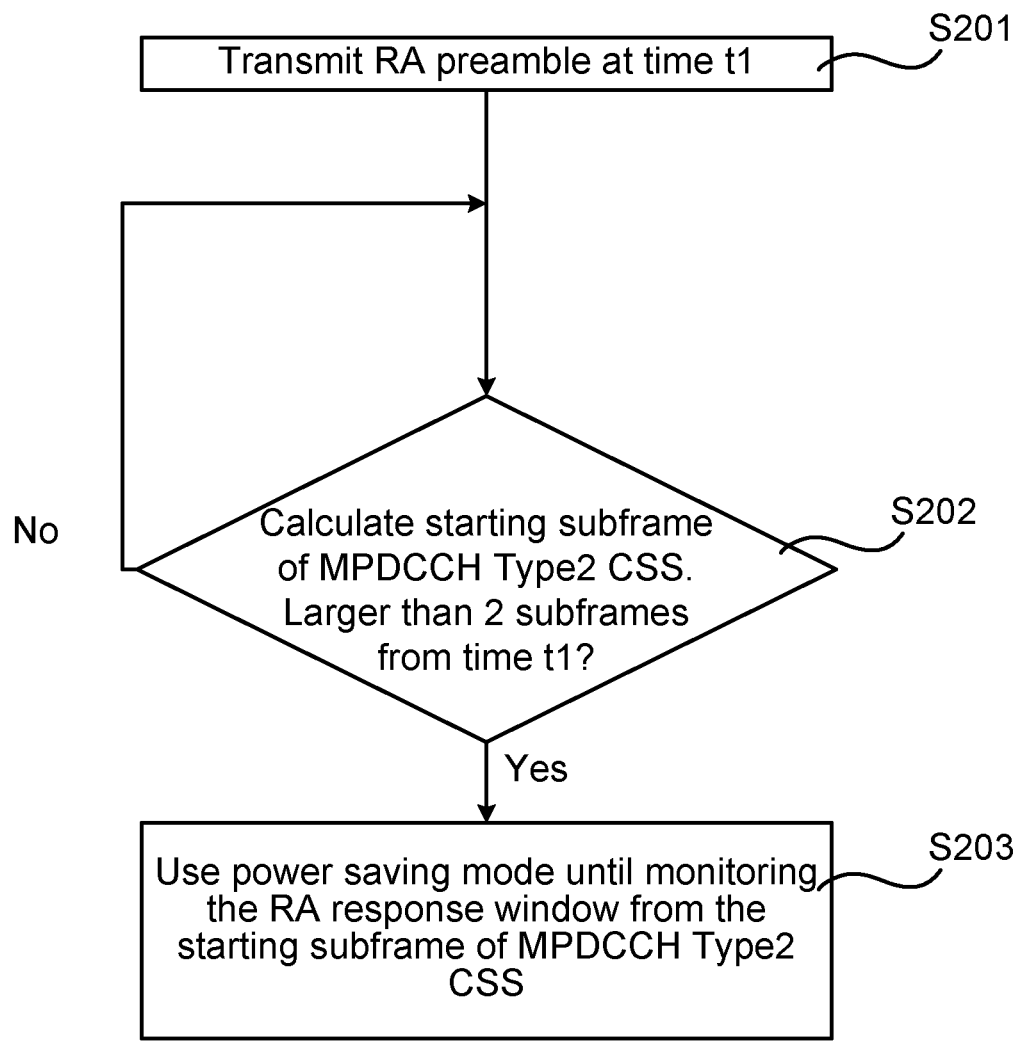

A particular embodiment for random access as performed by the wireless device 200 will now be disclosed with reference to the flow chart of FIG. 6.

S201: The wireless device 200 transmits a random access preamble at time $t_1$.

S202: The wireless device 200 determines the valid starting subframe of the MPDCCH Type2 CSS, and checks whether the starting subframe is larger than 2 subframe from time $t_1$.

If the valid starting subframe is not larger than 2 subframe from time $t_1$, for example when the current MPDCCH type2 CSS does not belong to the wireless device 200, the wireless device 200 determines a next valid starting subframe by entering step S202 again.

S203: If the valid starting subframe is larger than 2 subframe from time $t_1$, the wireless device 200 operates in power saving mode until monitoring the random access response window from the valid starting subframe of the MPDCCH Type2 CSS.

Figure 7:
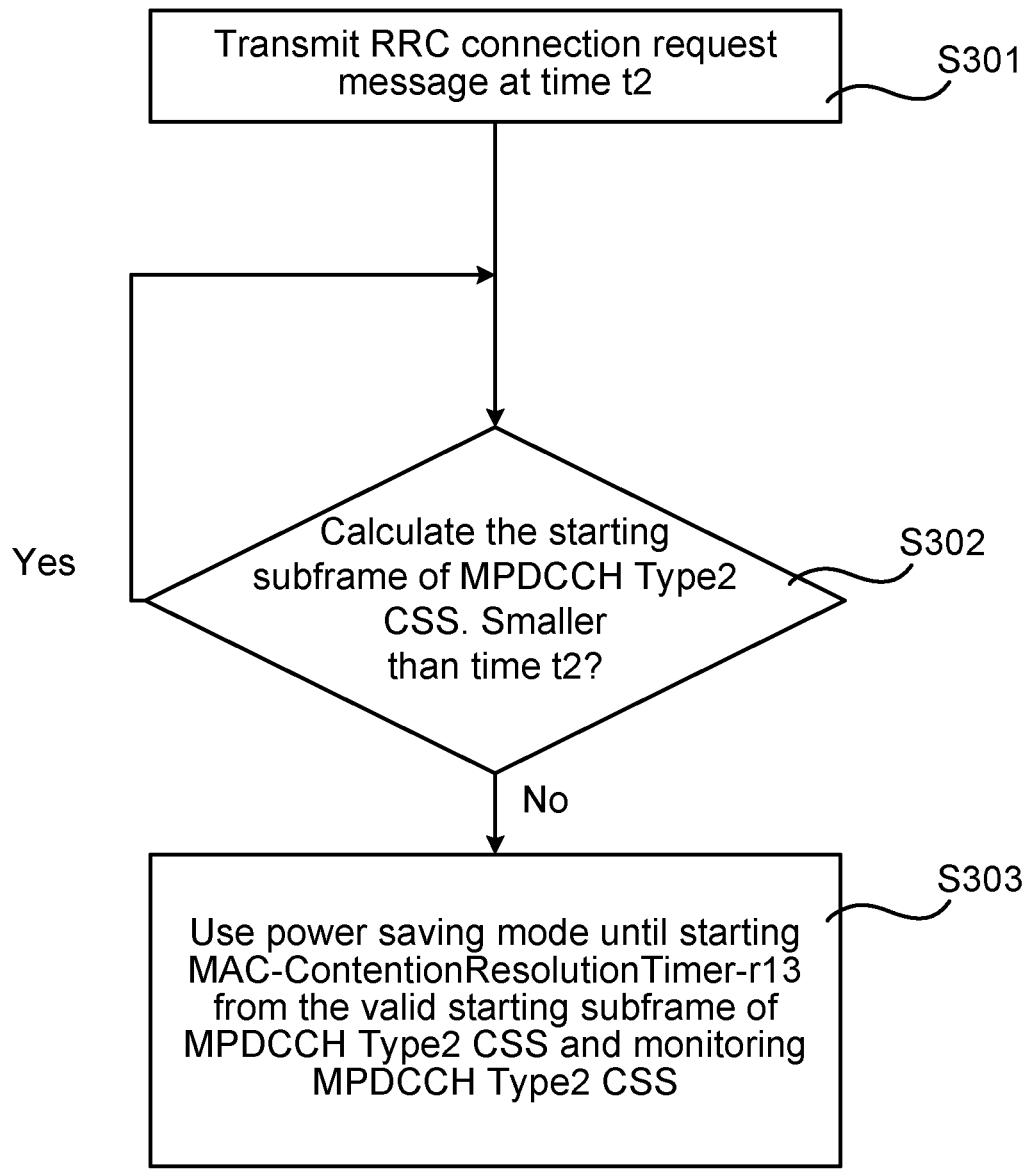

A particular embodiment for starting a timer as part of random access as performed by the wireless device 200 will now be disclosed with reference to the flow chart of FIG. 7.

S301: The wireless device 200 transmits a RRC connection request message at time $t_2$.

S302: The wireless device 200 determines the valid starting subframe of the MPDCCH Type2 CSS, and checks whether the starting subframe is smaller than time $t_2$.

If the valid starting subframe is smaller than time $t_2$, for example when the current MPDCCH type2 CSS does not belong to the wireless device 200, the wireless device 200 determines a next valid starting subframe by entering step S302 again.

S303: If the valid starting subframe is not smaller than time $t_2$, the wireless device 200 operates in power saving mode until the starting subframe of MPDCCH Type2 CSS occurs and then starts the MAC-ContentionResolution-Timer-r13.

Figure 8:
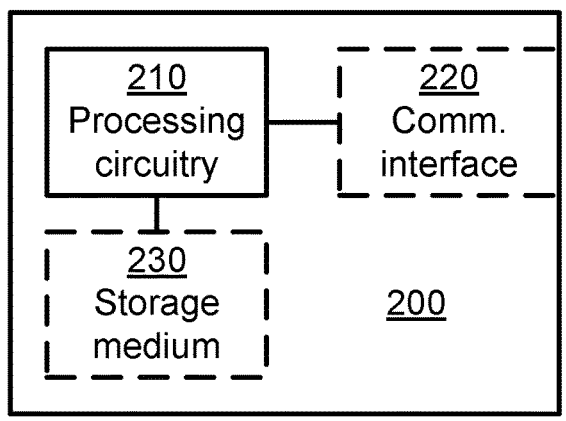
FIG. 8 is a schematic diagram showing functional units of a wireless device according to an embodiment.

FIG. 8 schematically illustrates, in terms of a number of functional units, the components of a wireless device 200 according to an embodiment.

Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, S102-S126, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The wireless device 200 may further comprise a communications interface 220 at least configured for communications at least with the network node 120. As such the communications interface 220 may comprise one or more transmitters and receivers, comprising analogue and digital components. The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 9:
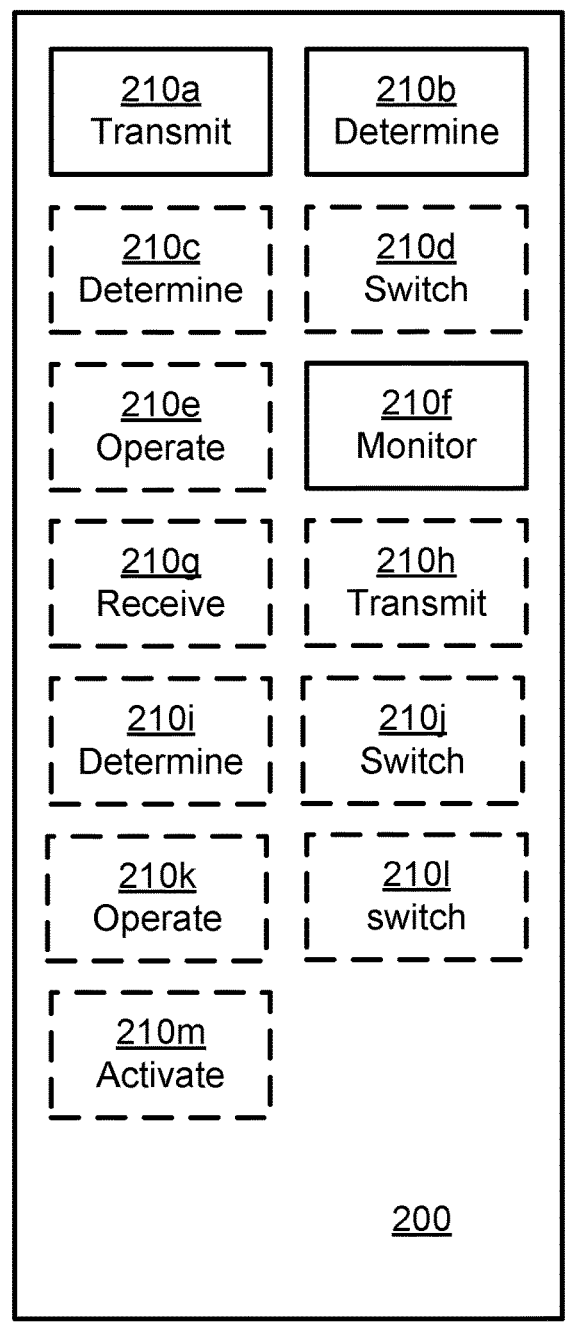
FIG. 9 is a schematic diagram showing functional modules of a wireless device according to an embodiment.

FIG. 9 schematically illustrates, in terms of a number of functional modules, the components of a wireless device 200 according to an embodiment. The wireless device 200 of FIG. 9 comprises a number of functional modules; a transmit module 210a configured to perform step S102, a determine module 210b configured to perform step S104, and a monitor module 210f configured to perform step S112. The wireless device 200 of FIG. 9 may further comprises a number of optional functional modules, such as any of a determine module 210c configured to perform step S106, a switch module 210d configured to perform step S108, an operate module 210e configured to perform step S110, a receive module 210g configured to perform step S114, a transmit module 210h configured to perform step S116, a determine module 210i configured to perform step S118, a switch module 210j configured to perform step S120, an operate module 210k configured to perform step S122, a switch module 210l configured to perform step S124, and an activate module 210m configured to perform step S126.

In general terms, each functional module 210a-210m may in one embodiment be implemented only in hardware or and in another embodiment with the help of software, i.e., the latter embodiment having computer program instructions stored on the storage medium 230 which when run on the processing circuitry makes the wireless device 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210m may be implemented by the processing circuitry 210, possibly in cooperation with functional units 220 and/or 230. The processing circuitry 210 may thus be configured to from the storage medium 230 fetch instructions as provided by a functional module 210a-210m and to execute these instructions, thereby performing any steps as disclosed herein.

Figure 10:
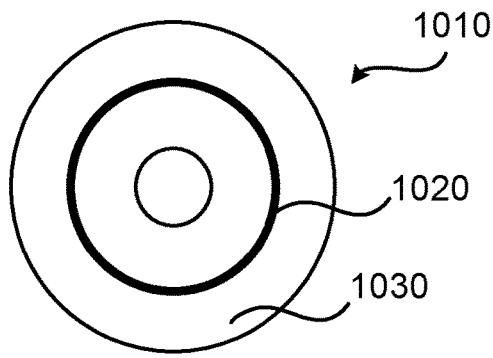
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, 100 execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for random access, the method being performed by a wireless device, the method comprising:
transmitting a random access preamble to a network node;
determining a valid starting subframe of a random access response window for monitoring a common search space for a random access response from the network node, wherein starting time of the random access response window is adapted such that it starts with the valid starting subframe;
monitoring the common search space for the random access response only during the random access response window;
receiving the random access response from the network node in the random access response window;
transmitting a radio resource control connection request message to the network node in response thereto; and
operating in a power saving mode until the valid starting subframe of the common search space occurs and then starts a Medium Access Control, MAC, contention resolution timer for a response from the network node to the radio resource control connection request message, wherein operating in the power save mode, if the valid starting subframe of the common search space is not smaller than time at which the radio resource control connection request message was transmitted.

2. The method according to claim 1, wherein the valid starting subframe is denoted a candidate starting subframe, wherein the random access preamble is transmitted at time $t_1$, the method further comprising:
determining, when the candidate starting subframe is distanced at most two subframes from said time $t_1$, a next valid starting subframe of the random access response window.

3. The method according to claim 1, further comprising: operating in a power saving mode between transmitting the random access preamble and monitoring the common search space.

4. The method according to claim 3, wherein the random access preamble is transmitted at time $t_1$, the method further comprising:
switching to said power saving mode.

5. The method according to claim 1, wherein the MAC contention resolution timer is a MAC-ContentionResolutionTimer-r13.

6. The method according to claim 1, wherein the radio resource control connection request message is transmitted at time $t_2$, the method further comprising:
determining, when the valid starting subframe for the response from the network node to the radio resource control connection request message occurs earlier than said time $t_2$, a next valid starting subframe of the random access response window for the response from the network node to the radio resource control connection request message.

7. The method according to claim 1, further comprising: operating in the power saving mode between transmitting the radio resource control connection request message and activating the MAC contention resolution timer.

8. The method according to claim 7, wherein the radio resource control connection request message is transmitted at time $t_2$, the method further comprising:
switching to said power saving mode; and
switching back to normal mode from said power saving mode at the valid starting subframe for the response from the network node to the radio resource control connection request message, wherein the MAC contention resolution timer is activated in response thereto.

9. The method according to claim 1, wherein the common search space is a Machine-Type Communications Physical Downlink Control Channel, MPDCCH.

10. The method according to claim 9, wherein the common search space is a MPDCCH Type2 common search space.

11. The method according to claim 1, wherein the valid starting subframe is determined based on an absolute subframe number, $n_{sf}^{abs}$, within a system frame number wrap-around period.

12. The method according to claim 1, wherein the valid starting subframe is determined according to $(10 n_f + \lfloor s/2 \rfloor) \bmod T_{MPDCCH} = 0$, where $n_f$ denotes system frame number, where $n_s$ denotes slot number within radio frame, where $T_{MPDCCH} = R_{max} \cdot G$, where $R_{max}$ is a maximum repetition level, and where G is an integer.

13. The method according to claim 12, wherein $R_{max}$ is one value of {1, 2, 4, 8, 16, 32, 64, 128, 256} with index given by a parameter mpdcch-NumRepetition-RA-r13.

14. The method according to claim 12, wherein G is one value of {1, 1.5, 2, 2.5, 4, 5, 8, 10} or one value of {1, 2, 4, 5, 8, 10, 20, spare1} with index given by a parameter mpdcch-startSF-CSS-RA-r13.

15. A wireless device for random access, the wireless device comprising:
processing circuitry;
and a computer program product storing instructions that, when executed by the processing circuitry, causes the wireless device to:
transmit a random access preamble to a network node;
determine a valid starting subframe of a random access response window for monitoring a common search space for a random access response from the network node, wherein starting time of the random access response window is adapted such that it starts with the valid starting subframe; and
monitor the common search space for the random access response only during the random access response windows;
receiving the random access response from the network node in the random access response window;
transmitting a radio resource control connection request message to the network node in response thereto; and
operating in a power saving mode until the valid starting subframe of the common search space occurs and then starts a Medium Access Control, MAC, contention resolution timer for a response from the network node to the radio resource control connection request message, wherein operating in the power save mode, if the valid starting subframe of the common search space is not smaller than time at which the radio resource control connection request message was transmitted.

* * * * *